(12) United States Patent
Miyata et al.

(10) Patent No.: US 12,345,021 B2
(45) Date of Patent: Jul. 1, 2025

(54) GREASE FEEDING PIPING ARRANGEMENT STRUCTURE IN CONSTRUCTION MACHINE

(71) Applicant: Caterpillar SARL, Geneva (CH)

(72) Inventors: Naoki Miyata, Akashi (JP); Kota Tatsumi, Akashi (JP); Hirokazu Koga, Akashi (JP); Toru Amaya, Akashi (JP); Kazufumi Nishimoto, Akashi (JP); Tetsuya Koshima, Akashi (JP); Hiroya Ito, Akashi (JP)

(73) Assignee: Caterpillar SARL, Geneva (CH)

( * ) Notice: Subject to any disclaimer, the term of this patent is extended or adjusted under 35 U.S.C. 154(b) by 911 days.

(21) Appl. No.: 17/437,317

(22) PCT Filed: Mar. 2, 2020

(86) PCT No.: PCT/EP2020/025109
§ 371 (c)(1),
(2) Date: Sep. 8, 2021

(87) PCT Pub. No.: WO2020/182345
PCT Pub. Date: Sep. 17, 2020

(65) Prior Publication Data
US 2022/0178109 A1    Jun. 9, 2022

(30) Foreign Application Priority Data
Mar. 8, 2019   (JP) .................... 2019-042209

(51) Int. Cl.
*E02F 9/22*     (2006.01)
*E02F 9/00*     (2006.01)
(Continued)

(52) U.S. Cl.
CPC ............ *E02F 9/2275* (2013.01); *E02F 9/006* (2013.01); *E02F 9/024* (2013.01); *E02F 9/0858* (2013.01); *F16N 11/00* (2013.01)

(58) Field of Classification Search
CPC ....... E02F 9/2275; E02F 9/006; E02F 9/8058; E02F 9/024; F16N 11/00
See application file for complete search history.

(56) References Cited

U.S. PATENT DOCUMENTS

| | | | | |
|---|---|---|---|---|
| 5,806,313 A | * | 9/1998 | Koshi | E02F 9/2275 60/458 |
| 6,899,509 B1 | * | 5/2005 | Mailleux | E02F 9/2275 37/468 |
| 8,944,717 B2 | * | 2/2015 | Ditzler | F01M 11/00 403/38 |

FOREIGN PATENT DOCUMENTS

| | | | |
|---|---|---|---|
| CN | 202913451 U | * | 5/2013 |
| CN | 204267510 U | * | 4/2015 |

(Continued)

OTHER PUBLICATIONS

International Search Report related to Application No. PCT/EP2020/025109; reported on Jun. 2, 2020.

*Primary Examiner* — Adam J Behrens
*Assistant Examiner* — Blake E Scoville

(57) ABSTRACT

In a construction machine where an arm, a working attachment, and a distal end portion of an extensible cylinder are coupled via a power link and an idler link, to achieve protection of a grease feeding piping when the grease feeding piping is arranged in the idler link, and to ensure that the structure of the idler link is not complicated. In an idler link, there is formed a protruding part which protrudes in a direction opposite to a bucket from a link body part of the idler link; there is provided a grease feeding piping arrangement space which extends in a link length direction, toward (Continued)

right and left inside of right and left outer side faces of the protruding part, with at least either one side of the side opposite to the bucket or right and left inward sides open; and a grease feeding piping is arranged in the grease feeding piping arrangement space, in a state of not protruding in a direction opposite to the bucket beyond a protruding distal end portion face of the protruding part and not protruding toward right and left inside beyond right and left inner side link faces of the link body part.

6 Claims, 7 Drawing Sheets

(51) Int. Cl.
  *E02F 9/02* (2006.01)
  *E02F 9/08* (2006.01)
  *F16N 11/00* (2006.01)

(56) References Cited

FOREIGN PATENT DOCUMENTS

| JP | 08144321 A | | 6/1996 | |
|----|---|---|---|---|
| JP | H08158402 A | * | 6/1996 | |
| JP | 2000204586 A | * | 7/2000 | |
| JP | 4219878 B2 | * | 2/2009 | ............ E02F 9/2271 |
| JP | 5397322 B2 | * | 1/2014 | |

* cited by examiner

GREASE FEEDING PIPING ARRANGEMENT STRUCTURE IN CONSTRUCTION MACHINE

This patent application is a 35 USC § 371 U.S. national stage of International Application No. PCT/EP2020/025109 filed on Mar. 2, 2020, which claims the benefit and priority of Japanese Application No. 2019-042209 filed on Mar. 8, 2019, the disclosures of which are incorporated in their entirety by reference herein.

TECHNICAL FIELD

The present invention relates to a technical field of a grease feeding piping arrangement structure in a construction machine such as a hydraulic shovel.

BACKGROUND ART

In general, for example, among construction machines such as hydraulic shovels, there are some which are configured such that a front working unit mounted on the machine body includes an arm, a bucket pivotally supported so as to be freely swingable at a distal end portion of the arm, and a bucket cylinder being, at its proximal end portion, supported by the arm, configured to extend and contract so as to cause the bucket to swing, and the arm and the bucket and the distal end portion of the bucket cylinder are coupled by a link mechanism consisting of a power link being, at its one end portion, pivotally supported so as to be freely swingable by the bucket, and being, at its other end portion, pivotally supported so as to be freely swingable at a distal end portion of the bucket cylinder; and an idler link being, at its one end portion, pivotally supported so as to be freely swingable on a shaft support portion formed at the other end portion of the power link and the distal end portion of the bucket cylinder, and being, at its other end portion, pivotally supported so as to be freely swingable by the arm.

Meanwhile, in devices configured such that a plurality of members pivotally supported so as to be freely swingable with one another like the front working unit of the hydraulic shovel, regular grease feeding to these shaft support portions is required. However, if the vehicle size of the construction machine is large and thus access into the shaft support portions from the ground is difficult, the distance between the shaft support portions is great, or there are many shaft support portions, then greasing work becomes complicated and time-consuming. Therefore, a centralized greasing system configured to carry out grease feeding by concentratedly arranging grease nipples in easily accessible locations of the vehicle, and arranging grease feeding piping from the concentratedly arranged greasing nipples to respective shaft support portions, and an automatic grease feeding system having a having a greasing pump installed on the vehicle, and distribution valves located at appropriate locations, configured to supply the grease from the distribution valves to respective shaft support portions by way of the grease feeding piping by operating the pump at a predetermined timing, have been conventionally known conventionally (for example, see Patent Literature 1).

When such a centralized greasing system or an automatic grease feeding system is adopted for the above-described front working unit of the hydraulic shovel, in order to apply grease to each of the shaft support portions which pivotally support one end portion and the other end portion of the power link, it is necessary to arrange the grease feeding piping which is routed on the arm side face so as to extend to the power link by way of the idler link. However, partly because the idler link provided near the bucket may be covered with earth and sand during excavation or the like, there is a problem that the grease feeding piping provided on the idler link may be easily damaged. Accordingly, the system of the Patent Literature 1 is configured such that a hollow grease pathway is formed inside the idler link, and the grease is supplied to the shaft support portions of the power link by way of the grease pathway inside the idler link. Further, the Patent Literature 1 discloses, as another example, a configuration where a recessed groove-shaped grease groove is formed in a link body side face part of the idler link, and a thin plate-shaped lid body that covers the recessed groove is welded to the link side face part.

PRIOR ART LITERATURES

Patent Literatures

[Patent Literature 1] Japanese Utility Model Application Laid-Open No. 6-53653

SUMMARY OF THE INVENTION

Problems to be Solved by the Invention

However, if a configuration is adopted in which the hollow grease path is formed inside the idler link as in the Patent Literature 1, there is a problem that the structure of the idler link becomes complicated and the manufacturing cost becomes excessive. Further, as in another example of Patent Literature 1, a groove is formed on the side surface of the link of the idler link and the groove is covered with a thin plate-like lid. At the same time, there is a concern that there is a high risk that the thin plate-shaped lid itself or the weld metal zone between the lid and the link side surface is damaged by collision with earth and sand. However, if the lid itself or the welded part of the lid is damaged, it must be repaired each time, and there is a risk that cracks etc. may occur in the idler link due to the damage of the welded part. There is a problem that it is necessary to be concerned that the strength of the device itself may be affected, and there is a problem to be solved by the present invention.

Means for Solving the Problems

The present invention has been created for the purpose of solving these problems in consideration of situations as described above. The present invention according to a first aspect is a grease feeding piping arrangement structure in a construction machine comprising a working attachment being pivotally supported at a distal end portion of an arm so as to be freely swingable via a first pin shaft; an extensible cylinder being, at its proximal end portion, supported by the arm, configured to extend and contract so as to cause the working attachment to swing; a power link being, at its one end portion, pivotally supported by the working attachment so as to be freely swingable via a second pin shaft and being, at its other end portion, pivotally supported at a distal end portion of the extensible cylinder so as to be freely swingable via a third pin shaft; and a pair of right and left idler links being, at its one end portion, pivotally supported so as to be freely swingable via the third pin shaft which pivotally supports the other end portion of the power link and the distal end portion of the extensible cylinder and being, at its other end portion, pivotally supported on the right and left side face parts of the arm so as to be freely swingable via a fourth pin shaft, wherein upon arranging a grease feeding piping in the idler link, the idler link is configured to have a link body part in a flat plate shape where pin holes for the third and fourth pin shafts are formed on both end sides; to form a protruding part which protrudes in a direction opposite to a working attachment from the link body part by causing the link width of the link body part to extend in a direction opposite to the working attachment; to set up a grease feeding piping arrangement space extending in a link length direction, in a right and left inside of right and left outer side faces of the protruding part, with at least either one side of the side opposite to the working attachment or right and left inward sides open; and to arrange the grease feeding piping in the grease feeding piping arrangement space, in a state of not protruding in a direction opposite to the working attachment beyond a protruding distal end portion face of the protruding part and not protruding right and left inwardly beyond right and left inner side link faces of the link body part.

A grease feeding piping arrangement structure in a construction machine according to a second aspect of the present invention is the grease feeding piping arrangement structure in the construction machine according to the first aspect, wherein the grease feeding piping arrangement space is formed into a shape of being cut out obliquely toward the right and left inner side link faces of the link body part from the protruding distal end portion face of the protruding part, with the side opposite to the working attachment and the right and left inward sides open A grease feeding piping arrangement structure in a construction machine according to a third aspect of the present invention is the grease feeding piping arrangement structure in the construction machine according to the first aspect, wherein the grease feeding piping space is formed into a shape of being cut out in the L-shape toward the right and left inner side link faces of the link body part from the protruding distal end portion face of the protruding part, with the side opposite to the working attachment and the right and left inward sides open A grease feeding piping arrangement structure in a construction machine according to a fourth aspect of the present invention is the grease feeding piping arrangement structure in the construction machine according to the first aspect, wherein the grease feeding piping space is formed into a recessed groove shape of being recessed into the protruding distal end portion face of the protruding part, with the side opposite to the working attachment open.

A grease feeding piping arrangement structure in a construction machine according to a fifth aspect of the present invention is the grease feeding piping arrangement structure in the construction machine according to the first aspect, wherein the grease feeding piping space is formed into a recessed groove shape of being recessed into the right and left side faces of the protruding part, with the right and left inward sides open.

A grease feeding piping arrangement structure in a construction machine according to a sixth aspect of the present invention is the grease feeding piping arrangement structure in the construction machine according to any one of the first to fifth aspects, wherein a piping fixing portion for fixing a grease feeding piping is provided in both end portions in a link length direction of the grease feeding piping space.

A grease feeding piping arrangement structure in a construction machine according to a seventh aspect of the present invention is the grease feeding piping arrangement structure in the construction machine according to any one of the first to sixth aspects, wherein the grease feeding piping arranged in the grease feeding piping space of the idler link is configured to be coupled to a distribution valve disposed on an arm opposing side link face of the power link, and to be supplied with grease from the distribution valve to one end portion and the other end portion of the power link.

Advantageous Effects of the Invention

According to the first aspect of the present invention, the grease feeding piping provided in the grease feeding piping arrangement space of the idler link can be protected, and the manufacturing cost can be suppressed without causing the structure of the idler link to be complicated.

According to the second, third, fourth and fifth aspects of the present invention, the grease feeding piping arrangement space can be formed simply, and the grease feeding piping can be arranged in the grease feeding piping arrangement space, in a state of not protruding in a direction opposite to the bucket beyond the protruding distal end portion of the protruding part and not protruding right and left inwardly beyond the right and left inner side link faces of the link body part.

According to the sixth aspect of the present invention, the grease feeding piping provided on the idler link can be prevented from being displaced accidently.

According to the seventh aspect of the invention, the risk of breakage or failure of the distribution valves disposed on the power link can be significantly reduced.

BRIEF DESCRIPTION OF THE DRAWINGS

FIGS. 3A-3D are figures illustrating an idler link in which grease feeding piping is arranged, wherein FIG. 3A is a front view, FIG. 3B is an X-X end view of FIG. 3A, FIG. 3C is a plan view, and FIG. 3D is an enlarged view of a main part of FIG. 3B.

DETAIL DESCRIPTION OF EMBODIMENTS

Figure 1:
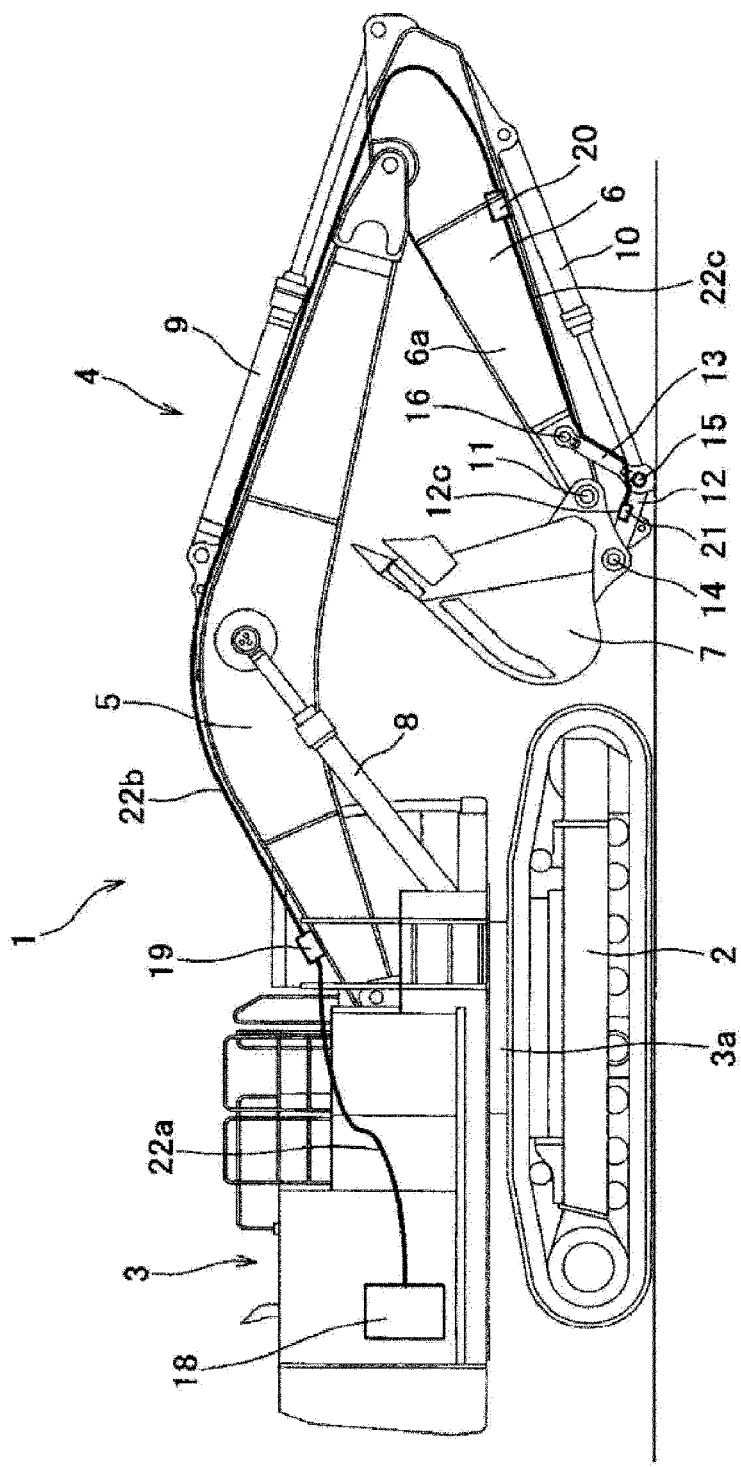
FIG. 1 is a side view of a hydraulic shovel.
Figure 2:
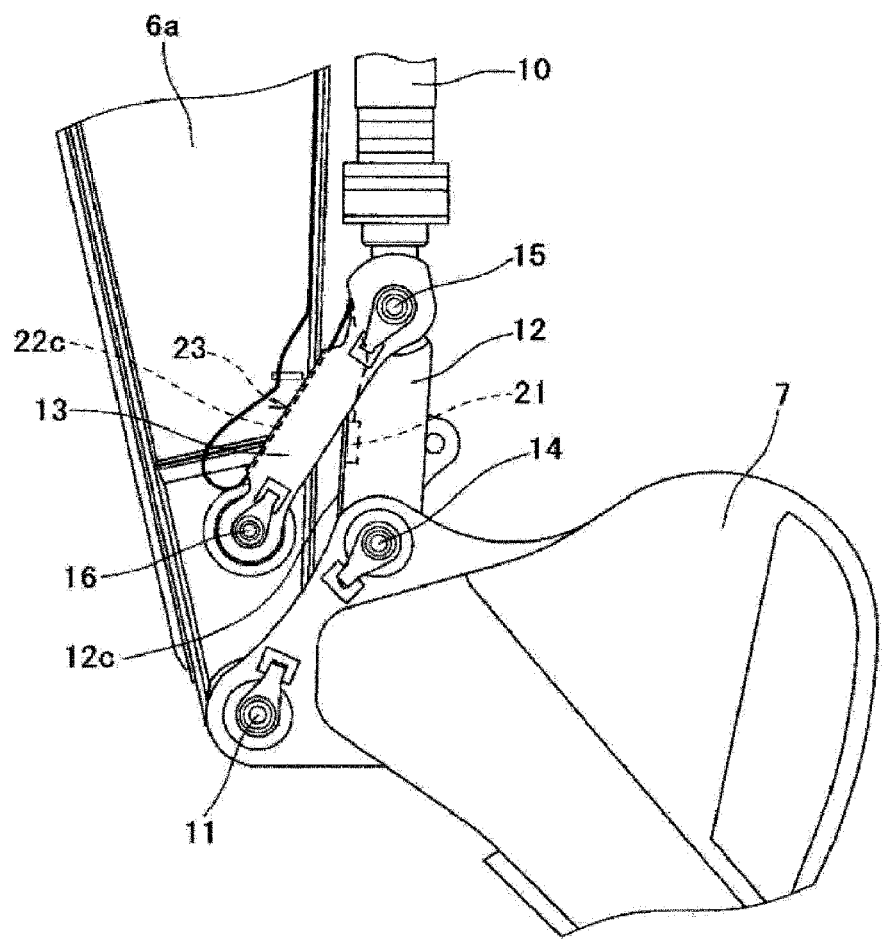
FIG. 2 is a view showing a link mechanism part that connects an arm, a bucket, and a bucket cylinder.
Figure 3A:
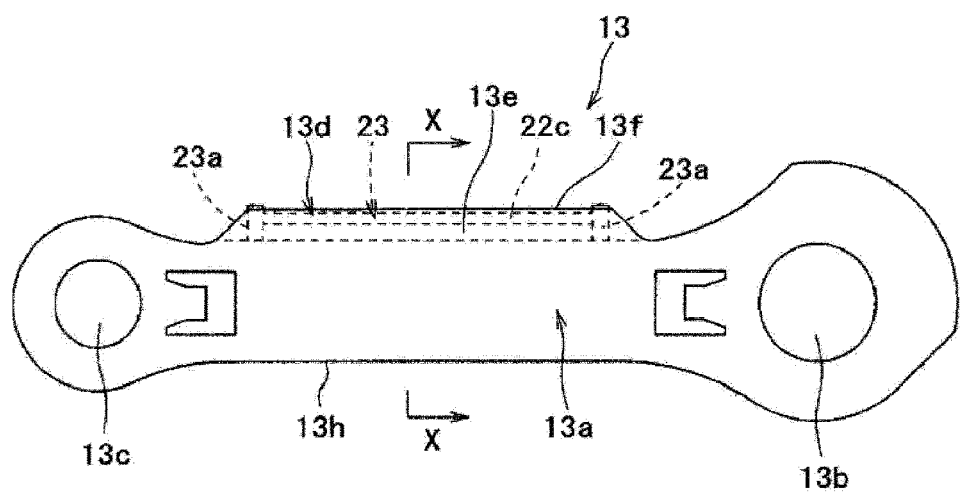
Figure 3B:
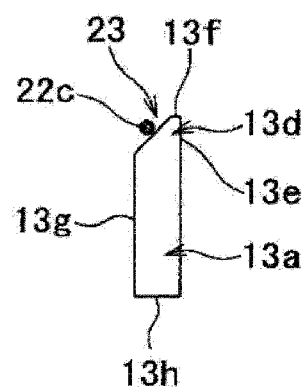
Figure 3C:
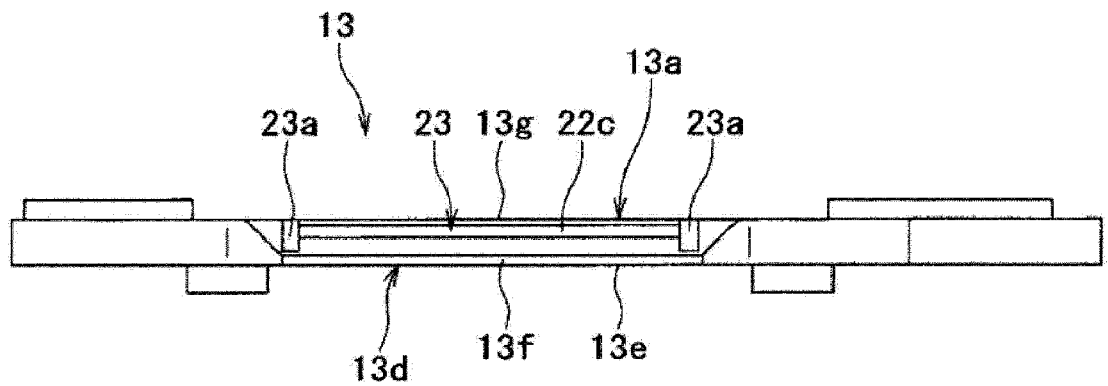
Figure 3D:
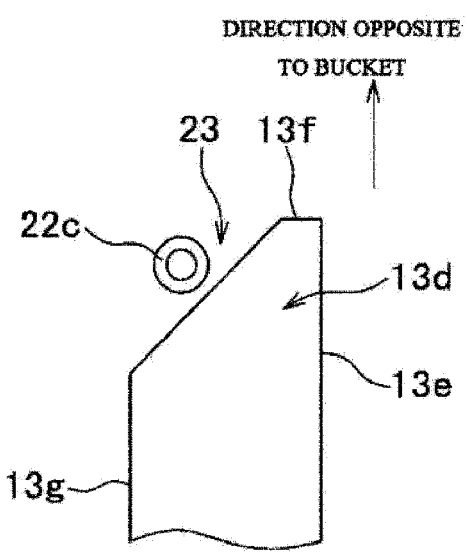
Figure 4:
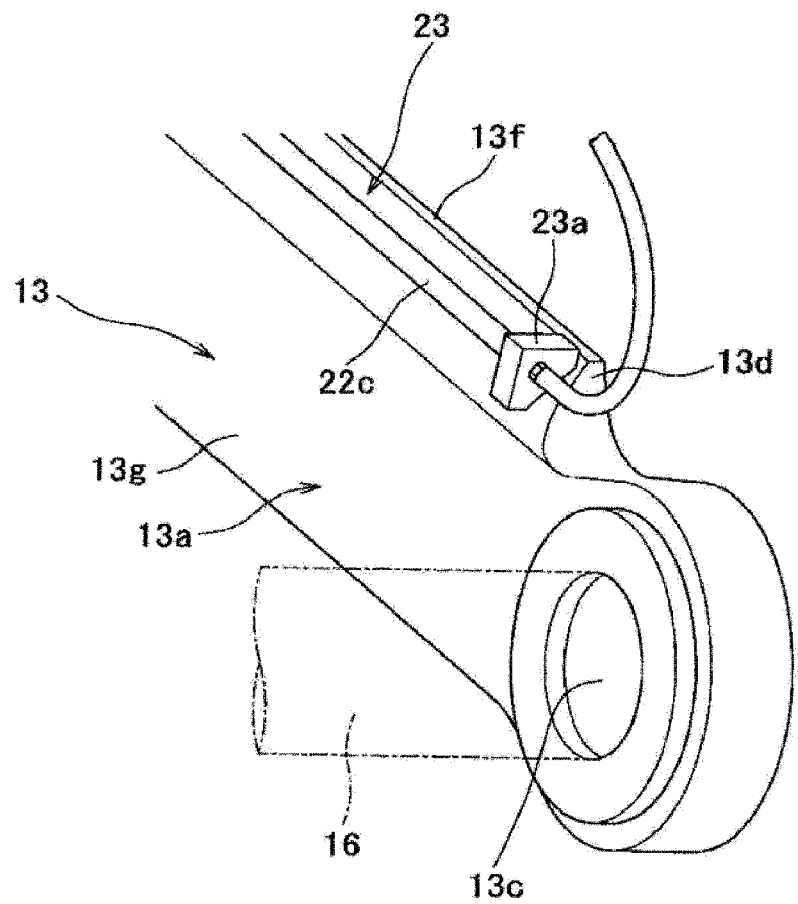
FIG. 4 is a partial perspective view of an idler link in which grease feeding piping is arranged.

Hereinbelow, embodiments of the present invention will be described with reference to the drawings. In the drawings, reference numeral 1 denotes a hydraulic shovel which is an example of a construction machine. The hydraulic shovel 1 includes a lower traveling structure 2, an upper revolving structure 3 which is revolvably supported by the lower traveling structure 2 via a revolving bearing 3a, a front working unit 4 mounted on the upper revolving structure 3, and so forth. The front working unit 4 further includes a boom 5 has a proximal end portion side thereof being pivotally supported by the upper revolving structure 3 so as to be swingable in the vertical (up-down) direction; an arm 6 being swingably supported at a distal end portion of the arm 5; a bucket (corresponding to a working attachment of the present invention) 7 being swingably supported at a distal end portion of the arm 6; and a boom cylinder 8, an arm cylinder 9, a bucket cylinder (corresponding to extensible cylinders of the present invention) 10 which extend and contract so as to cause the boom 5, the arm 6, and the bucket 7 to swing, respectively.

The bucket 7 is pivotally supported at the distal end portion of the arm 6 so as to be freely swingable via a first pin shaft 11, and the bucket cylinder 10 has a proximal end portion thereof being swingably supported at a proximal end portion side of the arm 6. However, a distal end portion of the bucket cylinder 10 (rod distal end portion) and the bucket 7 and the arm 6 are coupled by a link mechanism which is composed of a power link 12 and a pair of right and left idler links 13.

The power link 12 is, at its one end portion, pivotally supported by the bucket 7 so as to be freely swingable via a second pin shaft 14, and is, at its other end portion, pivotally supported at the rod distal end portion of the bucket cylinder 10 so as to be freely swingable via a third pin shaft 15. In this case, the other end portion of the power link 12 has right and left shaft support portions 12a which are branched into two sections, and the right and left shaft support portions 12a are pivotally supported by a third pin shaft 15 disposed on the right and left outer sides of the rod distal end portion of the bucket cylinder 10. Then, the power link 12 is configured such that one side of a link face 12c is opposed to the distal end portion of the arm 6 in a state where both end portions are supported by the second and third pin shafts 14, 15. However, on the arm opposing side link face 12c is disposed a third distribution valve 21 for greasing as described below (corresponding to a distribution valve disposed on an arm opposing side link face of the power link of the present invention).

The pair of right and left idler links 13 is, at their one end portions, pivotally supported so as to be freely swingable by the third pin shaft 15 which pivotally supports the other end portion of the power link 12 and the rod distal end portion of the bucket cylinder 10, and is, at their other end portions, pivotally supported on the right and left side faces 6a of the arm 6 so as to be freely swingable via a fourth pin shaft 16. In this case, one end portions of the pair of right and left idler links 13 are pivotally supported by the third pin shaft 15 on the right and left outer sides of the right and left shaft support portions 12a disposed on the other end portion of the power link 12, and the other end portions are pivotally supported on both right and left end portions of a fourth pin shaft 16 protruding from the right and left side face portions 6a of the arm 6 respectively. The idler links 13 are configured such that one side of a link width direction is opposed to the bucket 7 in a state where both end portions are pivotally supported by the third and fourth pin shafts 15, 16. In addition, in the idler links 13, there is formed a grease feeding piping arrangement space 23 for arranging a grease feeding piping 22c as described below which extends from the arm 6 side so as to extend to the third distribution valve 21 arranged on the power link 12 by way of the idler links 13. The grease feeding piping arrangement space 23 will be described below. In the present invention, opposing sides to each other of the pair of right and left idler links 13 are defined as right and left inner sides, and opposite of opposing sides are defined as right and left outer sides.

Next, an automatic grease feeding system provided in the hydraulic shovel 1 will be described. In FIG. 1, reference numeral 18 denotes a greasing pump, 19 denotes a first distribution valve disposed on the boom 5, 20 denotes a second distribution valve disposed on the arm 6, and 21 denotes a third distribution valve disposed on the power link 12. These distribution valves 19 to 21 are operable to relay and branch the grease fed from the greasing pump 18 so that the grease is caused to flow into a plurality of shaft support portions provided in the hydraulic shovel 1. That is, the grease fed from the greasing pump 18 is caused to flow into the respective distribution valves 19 to 21, by way of the grease feeding piping 22a from the greasing pump 18 extending to the first distribution valve 19, by way of the grease feeding piping 22b from the first distribution valve 19 extending to the second distribution valve 20, and by way of the grease feeding piping 22c from the distribution valve 20 extending to the third distribution valve 21, and from the respective distribution valves 19 to 21, the grease is caused to flow into the respective shaft support portions by way of the grease feeding piping (not illustrated in FIG. 1) from these respective distribution valves 19 to 21 extending to the respective shaft support portions. In FIG. 1, the greasing pump 18, the first, second, and third distribution valves 19, 20, 21, and the grease feeding pipings 22a, 22b, 22c are all shown by solid lines for clarity of these components.

The greasing pump 18 is configured to automatically operate and supply the grease under a predetermined condition, e.g., at every specified time. In addition, appropriate number of distribution valves can be arranged at appropriate locations in correspondence with their size or the like of construction machines such as hydraulic shovels. Further, the distribution valve may be a check valve or the one configured to include a nipple portion which allows manual application of grease.

Figure 5:
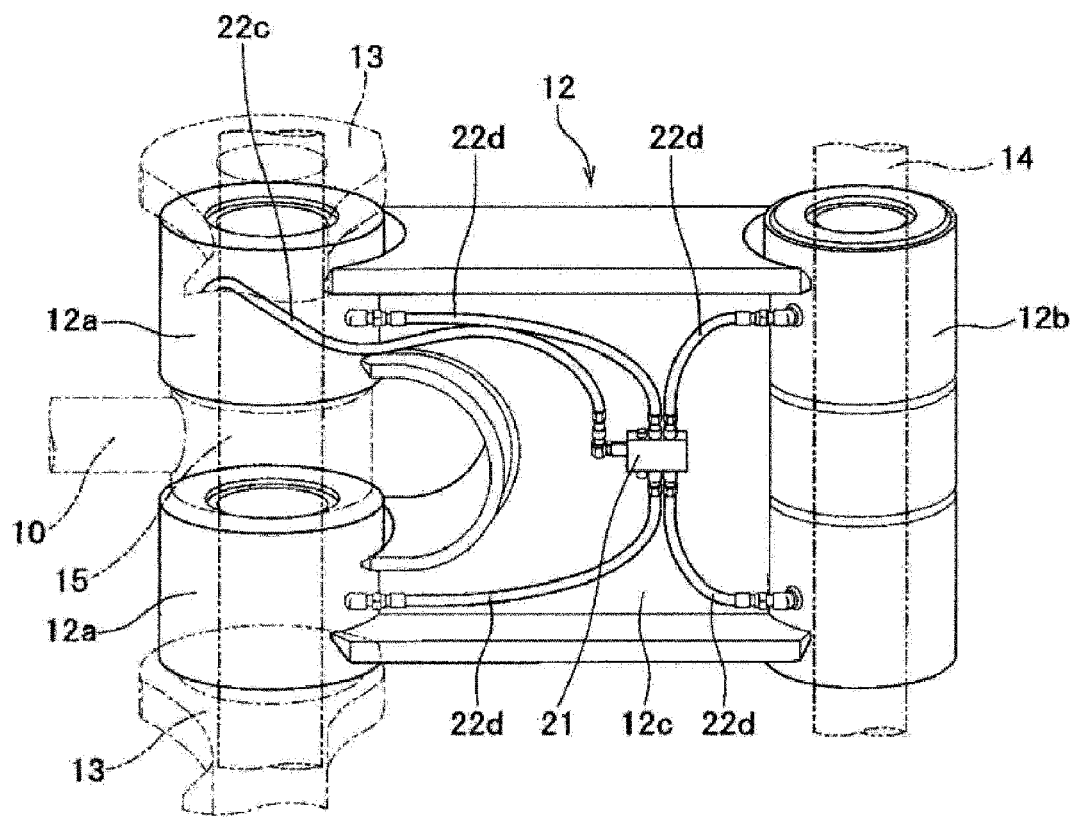
FIG. 5 is a figure illustrating a power link in which a distribution valve is disposed.

In the present embodiment, from the first distribution valve 19, the grease is fed via grease feeding piping (not illustrated) to a revolving bearing 3a, a shaft support portion formed at a proximal end portion of the boom 5, shaft support portions formed at a proximal end portion and a distal end portion of the boom cylinder 8, and a shaft support portion formed at a proximal end portion of the arm cylinder 9; from the second distribution valve 20, the grease is fed via grease feeding piping (not illustrated) to a shaft support portion formed at a distal end portion of the boom 5 and a proximal end portion of the arm 6, a shaft support portion formed at a distal end portion of the arm cylinder 9, a shaft support portion which supports a proximal end portion of the bucket cylinder 10, a shaft support portion which supports the distal end portion of the arm 6 and the bucket 7 via the first pin shaft 11, a shaft support portion which supports the other end portion of the idler link 13 and the arm 6 via the fourth pin shaft 16; furthermore, from the third distribution valve 21, the grease is fed via the grease feeding piping 22d, as illustrated in FIG. 5, into shaft support portions formed at the both end portions of the power link 12, that is, a shaft support portion 12b formed at one end portion of the power link 12 and the bucket 7; and the shaft support portions 12a formed at the other end portion of the power link 12 and one end portion of the idler link 13 via the third pin shaft 15.

Now, as described above, the grease feeding piping 22c extending from the second distribution valve 20 disposed on the arm 6 to the third distribution valve 21 disposed on the power link 12 is arranged so as to extend from the arm 6 side to the power link 12 by way of the idler link 13. The idler link 13 is provided with a grease feeding piping arrangement space 23 in which the grease feeding piping 22c is arranged. The structure of the idler link 13 and the feeding piping arrangement space 23 will be described below.

The idler link 13 has a link body part 13a in a flat plate shape. At both end portions of the link body part 13a are formed pin holes 13b, 1:3c through which the third and fourth pin shafts 15, 16 are inserted respectively. The link width of the link body part 13a (width in a direction intersecting perpendicularly to a line connecting the center portions of the pin holes 13b, 13c) is set to be wider than the hole diameters of the pin holes 13b. 13c. The link width required for the idler link 13 in terms of strength can be secured by the link width of the link body part 13a. Furthermore, in the idler link 13, there is formed a protruding part (ear part) 13d that protrudes in a direction opposite to the bucket 7 from the link body part 13a by extending the link width of the link body part 13a toward the side opposite to the bucket 7. In the right and left inward sides of the right and left outer side faces 13e of the protruding part 13d, there is provided a grease feeding piping arrangement space 23 extending in a link length direction (a direction parallel to a line connecting the center portions of the pin holes 13b, 13c). The grease feeding piping arrangement space 23 is formed in a shape of being obliquely cut out from a protruding distal end portion face 13f of the protruding part 13d toward right and left inner side link faces 13g of the link body part 13a, and right and left outward sides thereof are covered by right and left outer side faces 13e of the protruding part 13d, and the bucket 7 side is covered by the link body part 13a, whereas the side opposite to the bucket 7 and the right and left inward sides are open. Then, in the grease feeding piping arrangement space 23, the grease feeding piping 22c is arranged in a state of not protruding in the direction opposite to the bucket 7 beyond the protruding distal end portion face 13f of the protruding part 13d, and not protruding right and left inwardly beyond the right and left inner side link faces 13g of the link body part 13a. Consequently, collision of earth and sand and the like scattered from the bucket 7 side or the right and left outward sides to the grease feeding piping 22c can be reliably prevented by the right and left outer side faces 13e of the protruding part 13d and the link body part 13a, and further the earth and sand and the like scattered from the side opposite to the bucket 7 or the right and left inward sides will come into contact with the protruding distal end portion face 13f of the protruding part 13d and the right and left inner side link faces 132 of the link body part 13a earlier than the grease feeding piping 22c, if the earth and sand are not fine. As a result, the grease feeding piping 22c can be effectively protected.

Further, at both end portions in the link length direction of the grease feeding piping arrangement space 23, pipe fixing portions 23a for fixing the grease feeding piping 22c are provided, and by being fixed to the pipe fixing portions 23a, the grease feeding piping 22c arranged in the feeding piping arrangement space 23 can be prevented from being displaced. The pipe fixing portion may be of a support shape that supports grease feeding piping, or may be of a block shape where the end of the grease feeding piping is embedded. In the case of the block shape, the pipe fixing portion can have a structure that is also served as a connector for interconnecting the grease feeding piping of the portion arranged in the grease feeding piping arrangement space of the idler link and grease feeding piping at the front and back portions thereof.

In the present embodiment configured as described above, a hydraulic shovel 1 includes a bucket (working attachment) 7 pivotally supported at the distal end portion of an arm 6 so as to be freely swingable via a first pin shaft 11; a bucket cylinder (extensible cylinder) 10 being, at its proximal end portion, supported by the arm 6 and extends, configured to extend and contract so as to cause the bucket 7 to swing; a power link 12 being, at its one end portion, pivotally supported by the bucket 7 so as to be freely swingable via a second pin shaft 14, and being, at its other end portion, pivotally supported at a distal end portion of the bucket cylinder 10 so as to be freely swingable via a third pin shaft 15; and a pair of right and left idler links 13 being, at their one end portions, pivotally supported so as to be freely swingable via the third pin shaft 15 which pivotally supports the other end portion of the power link 12, and being, at their other end portions, pivotally supported on right and left side face parts 6a of the arm 6 so as to be freely swingable via a fourth pin shaft 16, wherein upon arranging grease feeding piping 22c in the idler link 13, the idler link 13 has a link body part 13a in a flat plate shape where pin holes 13b, 13c for the third and fourth pin shafts 15, 16 are formed on both end sides, and further there is formed a protruding part 13d which protrudes in a direction opposite to the bucket 7 from the link body part 13a by causing the link width of the link body part 13a to extend in the direction opposite to the bucket 7. Furthermore, in right and left inward sides of right and left outer side faces 13e of the protruding part 13d, there is provided a grease feeding piping arrangement space 23 extending in a link length direction and having a shape where at least either one side of the side opposite to the bucket 7 or right and left inward sides is open, and in the grease feeding piping arrangement space 23, the grease feeding piping 22c is arranged in a state of not protruding in the direction opposite to the bucket 7 beyond a protruding distal end portion face 13f of the protruding part 13d and not protruding right and left inwardly beyond right and left inner side link faces 13g of the link body part 13a.

As a result, right and left outward sides of the grease feeding piping 22c arranged in the grease feeding piping arrangement space 23 are covered by the right and left outer side faces 13e of the protruding part 13d, and the bucket 7 side thereof is covered by the link body part 13a, and accordingly, the earth and sand and the like scattering from the bucket 7 side or the right and left outward sides can be reliably prevented from colliding with the grease feeding piping 22c. On the other hand, even if earth and sand and the like is scattered from the side opposite to the bucket 7 or right and left inward sides though less than the one scattered from the bucket 7 side or the right and left outward sides, such earth and sand if not fine will come into contact with the protruding distal end portion face 13f of the protruding part 13d or the right and left inner side link faces 13a of the link body part 13a earlier than the grease feeding piping 22c, with the result that the grease feeding piping 22c can be effectively protected. In addition, since the grease feeding piping arrangement space 23 is of a shape where at least either one of the side opposite to the bucket 7 or the right and left inward sides is open, the manufacturing cost of the idler link 13 can be suppressed without complicating the structure of the idler link like the structure in which a hollow grease feeding pathway is formed inside the idler link, and repair or replacement of the grease feeding piping 22c can be easily performed as well. In the present embodiment, the right and left idler links are formed symmetrical to the right and left each having the grease feeding piping arrangement space, and grease feeding piping can be arranged in the power link even by way of any of the right and left idler links. However, a configuration in which the grease feeding piping arrangement space is provided only either one of the right and left idler links may be used.

Furthermore, in the present embodiment, the grease feeding piping arrangement space 23 has a shape of obliquely cut out toward the right and left inner side link faces 13g of the link body part 13a from the protruding distal end portion face 13f of the protruding part 13d, and the side opposite to the bucket 7 and the right and left inward sides are open, but the grease feeding piping arrangement space 23 having such a shape can be easily formed, and the grease feeding piping 22c will be able to be arranged in a state of not protruding in the direction opposite to the bucket 7 beyond the protruding distal end portion face 13f of the protruding part 13d and not protruding right and left inwardly beyond the right and left inner side link faces 13g of the link body part 13a.

Further, at both end portions in the link length direction of the grease feeding piping arrangement space 23, a pipe fixing portion 23a for fixing the grease feeding piping 22c is provided, so that the grease feeding piping 22c arranged on the idler ink 13 can be prevented from being displaced inadvertently.

Furthermore, the grease feeding piping 22c arranged in the grease feeding piping arrangement space 23 of the idler link 13 is coupled to a distribution valve 21 disposed on an arm opposing side link face 12c of the power link 12, and is configured such that the grease can be supplied to one end portion and the other end portion of the power link 12 from the distribution valve 21. Accordingly, the grease will be able to be supplied to the shaft support portions 12a, 12b at both end portions of the power link 12, via the grease feeding piping 22c arranged on the idler link 13 and the distribution valve 21 disposed on the power link. However, in this case, the distribution valve 21 is in a state of being protected by the arm 6 by being disposed on the arm opposing side link face 12c of the power link 12, so that the risk of breakage or failure of the distribution valve 21 can be significantly reduced.

Figure 6A:
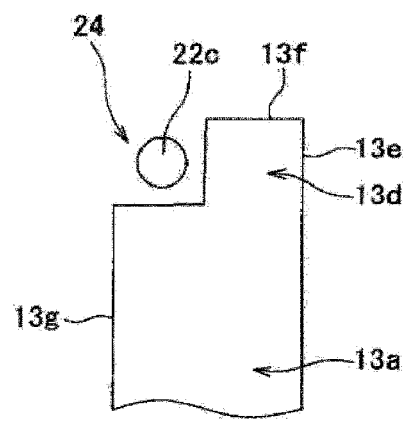
FIGS. 6A, 6B, and 6C are figures illustrating other examples of grease feeding piping arrangement spaces.
Figure 6B:
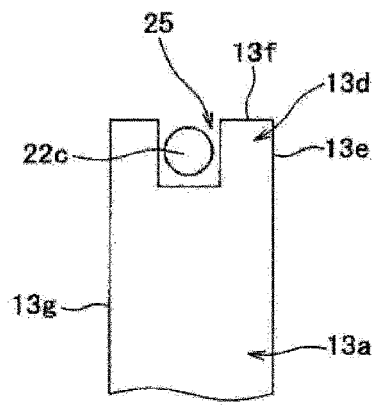
Figure 6C:
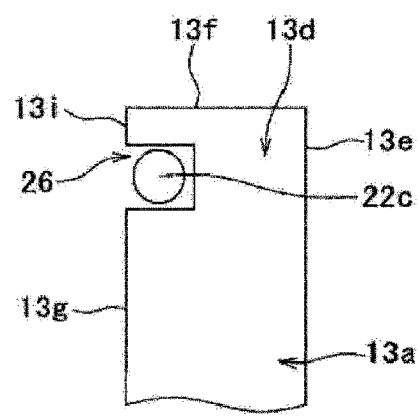

It is a matter of course that the present invention is not limited to the above-described embodiment, and as a shape of the grease feeding piping arrangement space, it is only necessary that the space is provided in the right and left inside of the right and left outer side faces of the protruding part, and extends in the link length direction, and at least either one side of the side opposite to working attachment or the right and left inward sides is open. For example, as illustrated in FIG. 6A, a grease feeding piping arrangement space 24 being cut out in an L-shape toward the right and left inner side link faces 13g of the link body part 13a from the protruding distal end portion face 13f of the protruding part 13d, with the side opposite to working attachment and the right and left inward sides open; as illustrated in FIG. 6B, a grease feeding piping arrangement space 25 formed in a recessed groove shape of being recessed into the protruding distal end portion face 13f of the protruding part 13d, with the side opposite to the working attachment open; as illustrated in FIG. 6C, a piping arrangement space 26 in a recessed groove shape of being recessed into the right and left inner side faces 13i of the protruding part 13d, with the right and left inward sides open, may be also used, but the formation of the piping arrangement spaces 24, 25, 26 in these shapes are simple, and even in the grease feeding piping arrangement spaces 24, 25, 26 in whichever shape, the grease feeding piping 22c will be able to be arranged in a state of not protruding in the direction opposite to the working attachment beyond the protruding distal end portion face 13f of the protruding part 13d and not protruding right and left inwardly beyond the right and left inner side link faces 13g of the link body part 13a.

INDUSTRIAL APPLICABILITY

The present invention can be utilized when grease feeding piping is arranged in a working machine such as a hydraulic shovel.

The invention claimed is:

1. A grease feeding piping arrangement structure in a construction machine comprising:
    a working attachment being pivotally supported at a distal end portion of an arm so as to be freely swingable via a first pin shaft;
    an extensible cylinder being, at its proximal end portion, supported by the arm, configured to extend and contract so as to cause the working attachment to swing;
    a power link being, at its one end portion, pivotally supported by the working attachment so as to be freely swingable via a second pin shaft, and being, at its other end portion, pivotally supported at a distal end portion of the extensible cylinder so as to be freely swingable via a third pin shaft; and
    a pair of right and left idler links being, at its one end portion, pivotally supported so as to be freely swingable via the third pin shaft which pivotally supports the other end portion of the power link and the distal end portion of the extensible cylinder, and being, at its other end portion, pivotally supported on the right and left side face parts of the arm so as to be freely swingable via a fourth pin shaft,
    wherein upon arranging a grease feeding piping in the idler link, the idler link is configured to have a link body part in a flat plate shape which pin holes for the third and fourth pin shafts are formed on both end sides; to form a protruding part which protrudes in a direction opposite to a working attachment from the link body part by causing a link width of the link body part to extend in a direction opposite to the working attachment; to set up a grease feeding piping arrangement space extending in a link length direction, in a right and left inside of right and left outer side faces of the protruding part, with at least either one side of the side opposite to the working attachment or right and left inward sides open; and to arrange the grease feeding piping in the grease feeding piping arrangement space, in a state of not protruding in a direction opposite to the working attachment beyond a protruding distal end portion face of the protruding part and not protruding right and left inwardly beyond right and left inner side link faces of the link body part; and
    wherein a piping fixing portion for fixing the grease feeding piping is provided in both end portions in a link length direction of the grease feeding piping arrangement space.

2. The grease feeding piping arrangement structure for the construction machinery according to claim 1, wherein the grease feeding piping arrangement space is formed into a shape of being cut out in the L-shape toward the right and left inner side link faces of the link body part from the protruding distal end portion face of the protruding part, with the side opposite to the working attachment and the right and left inward sides open.

3. The grease feeding piping arrangement structure for the construction machinery according to claim 1, wherein the grease feeding piping arrangement space is formed into a recessed groove shape of being recessed into the protruding distal end portion face of the protruding part, with the side opposite to the working attachment open.

4. The grease feeding piping arrangement structure for the construction machinery according to claim 1, wherein the grease feeding piping arrangement space is formed into a recessed groove shape of being recessed into the right and left side faces of the protruding part, with the right and left inward sides open.

5. The grease feeding piping arrangement structure for the construction machinery according to claim 1, wherein the grease feeding piping arranged in the grease feeding piping arrangement space of the idler link is configured to be coupled to a distribution valve disposed on an arm opposing side link face of the power link, and to be supplied with grease from the distribution valve to one end portion and the other end portion of the power link.

6. A grease feeding piping arrangement structure in a construction machine comprising:
- a working attachment being pivotally supported at a distal end portion of an arm so as to be freely swingable via a first pin shaft;
- an extensible cylinder being, at its proximal end portion, supported by the arm, configured to extend and contract so as to cause the working attachment to swing;
- a power link being, at its one end portion, pivotally supported by the working attachment so as to be freely swingable via a second pin shaft, and being, at its other end portion, pivotally supported at a distal end portion of the extensible cylinder so as to be freely swingable via a third pin shaft; and
- a pair of right and left idler links being, at its one end portion, pivotally supported so as to be freely swingable via the third pin shaft which pivotally supports the other end portion of the power link and the distal end portion of the extensible cylinder, and being, at its other end portion, pivotally supported on the right and left side face parts of the arm so as to be freely swingable via a fourth pin shaft, wherein upon arranging a grease feeding piping in the idler link, the idler link is configured to have a link body part in a flat plate shape which pin holes for the third and fourth pin shafts are formed on both end sides; to form a protruding part which protrudes in a direction opposite to a working attachment from the link body part by causing a link width of the link body part to extend in a direction opposite to the working attachment; to set up a grease feeding piping arrangement space extending in a link length direction, in a right and left inside of right and left outer side faces of the protruding part, with at least either one side of the side opposite to the working attachment or right and left inward sides open; and to arrange the grease feeding piping in the grease feeding piping arrangement space, in a state of not protruding in a direction opposite to the working attachment beyond a protruding distal end portion face of the protruding part and not protruding right and left inwardly beyond right and left inner side link faces of the link body part; and wherein the grease feeding piping arrangement space is formed into a shape of being cut out obliquely toward the right and left inner side link faces of the link body part from the protruding distal end portion face of the protruding part, with the side opposite to the working attachment and the right and left inward sides open.

* * * * *